United States Patent [19]

Johnston

[11] Patent Number: 4,727,247

[45] Date of Patent: Feb. 23, 1988

[54] LIGHT ATTENUATION SENSING APPARATUS FOR MEASURING PHYSICAL PARAMETERS AND OTHER VARIABLES UTILIZING A LIGHT CONDUCTING MEMBER CONTAINING A FLUORESCENT MATERIAL

[75] Inventor: James S. Johnston, Bognor Regis, England

[73] Assignee: Rosemount Limited, United Kingdom

[21] Appl. No.: 943,385

[22] Filed: Dec. 17, 1986

[30] Foreign Application Priority Data

Dec. 20, 1985 [GB] United Kingdom ............... 8531430

[51] Int. Cl.$^4$ .............................................. H01J 5/16
[52] U.S. Cl. .................................. 250/227; 250/231 R; 250/577
[58] Field of Search ............... 250/231 R, 227, 458.1, 250/573, 576, 577; 350/96.34, 96.29; 356/373; 73/293

[56] References Cited

U.S. PATENT DOCUMENTS

| | | | |
|---|---|---|---|
| 4,403,826 | 9/1983 | Presby | 350/96.34 |
| 4,562,348 | 12/1985 | Brogardh et al. | 250/231 |
| 4,569,570 | 2/1986 | Brogardh et al. | 350/96.34 |
| 4,596,925 | 6/1986 | Gilby | 250/227 |
| 4,678,904 | 7/1987 | Sasski et al. | 250/227 |

FOREIGN PATENT DOCUMENTS 1081109 10/1963 United Kingdom .
1493843 11/1977 United Kingdom .

Primary Examiner—Edward P. Westin
Assistant Examiner—Jessica L. Ruoff
Attorney, Agent, or Firm—Kinney & Lange

[57] ABSTRACT

A displacement sensor employs a light conducting member containing a fluorescent material. A source of irradiating light is movable relative to the light conducting member along a track. The irradiating light produces fluorescence within the member at a corresponding position. Light from the fluorescent point is conducted in both directions along the member and can thus be collected at one end for feeding to a photo detector. By monitoring variations in the intensity of light at the detector, the distance of the fluorescent point from the end of the member can be measured, and thus movement of the source along the track monitored. Additional embodiments enable dependency on the intensity of the irradiating light source and on losses between the light conducting member and the photo detector, to be mathematically eliminated. Further embodiments measure the attenuation between two fluorescent points in a length of fibre, and can be used to sense any physical parameter that can be arranged to affect this attenuation, such as stress, bending or temperature.

28 Claims, 20 Drawing Figures

LIGHT ATTENUATION SENSING APPARATUS FOR MEASURING PHYSICAL PARAMETERS AND OTHER VARIABLES UTILIZING A LIGHT CONDUCTING MEMBER CONTAINING A FLUORESCENT MATERIAL

BACKGROUND OF THE INVENTION

1. Field of the Invention

The present invention relates to light attenuation sensing apparatus.

Many physical parameters and other variables can be measured or sensed using optical transducers which convert the parameter to be measured into an optical signal. For example, known displacement sensors include optical sensors in which a coded track is moved between a source of light and a photo detector so that the displacement, or the position of the track relative to the sensor, can be determined. Such devices require electronic components, for example the photo detector itself, to be located immediately at the displacement sensor. This requires on the one hand the provision of an electrical supply to the sensor, and on the other hand the need to feed from the sensor electronic singals representing the displacement measured.

In some applications, it is desirable to provide transducers for measuring various parameters, including for example displacement, which contain no electronic components and which include no electrical interconnections between the transducer and remote apparatus in which the measured parameter is to be utilised. It has been proposed to employ transducers employing optical techniques, connected to the remote utilisation apparatus by means of optical fibres. Various sensors for measuring different parameters in this way have been proposed in the art.

2. The Prior Art

European Patent Specification No. 0091394 (which is equivalent to U.S. Pat. No. 4,562,348) and European Patent Specification No. 0095673 (which is equivalent to U.S. Pat. No. 4,569,570) disclose optical sensors employing the time delay characteristic of a luminescent material to measure various selected physcial quantities. The sensor is connected by an optical fibre to apparatus for generating light pulses to energise the sensor and for receiving and analysing light signals from the sensor.

United Kingdom Pat. No. 1,081,109 discloses a rod of light conducting material located to collect reflected or transmitted light from a light source which extends across the width of a web of material being checked for flaws. Light collected in the rod is conducted to the ends of the tube for detection by photo-detectors. In order to collect transmitted or specularly reflected light, the rod is formed at least partially of fluorescent material. The disclosed apparatus is capable of detecting holes or other flaws in the material web. However the light conducting rod is used simply to collect light from all points across the width of the web, thereby avoiding the need for a large number of photo-detectors.

German Specification No. 1211421 to Sick is equivalent to the above UK Pat. No. 1,081,109 and there is a further German No. 2009001 also to Sick which is a Patent of Addition to No. 1211421. This German No. 2009001 discloses an improvement in the apparatus of No. 1211421, whereby the illuminating light is amplitude modulated at a set frequency, and the detected light amplitude then filtered, so as to distinguish reflected or transmitted light from background illumination.

United Kingdom Pat. No. 1,493,843 and its equivalent German Pat. No. 2,433,683, also to Sick, disclose a further development of the apparatus for detecting flaws in webs. Two collecting rods are provided, one for detecting scattered light from the web under test and one for detecting specularly reflected light. Also photo-detectors are provided at opposite ends of the rods, with different colour filters, so that the armount of reflected and scattered light at different regions of the spectrum can be measured.

French Specification No. 2545925 to Brunner et al discloses an arrangement for monitoring the edge of a travelling web. Light from a lamp illuminates an elongate detector partially occluded by the edge of the web material. The elongate detector has a strip or tube of fluorescent material mounted in a transparent containing tube. Photo-diodes are mounted all along an edge of the strip to detect fluorescence in the strip caused by impinging light from the lamp. The photo-diodes are connected in parallel, so that the total current drawn from a supply is indicative of the amount of the strip which is illuminated.

BRIEF SUMMARY OF THE INVENTION

Unlike any of the aforementioned prior art, this invention senses variations in the attenuation of light from a substantially point source to a detector.

In one example of the invention providing a displacement sensor, the attenuation is dependent on the distance of movable source from the detector.

The invention thus provides a displacement sensor employing optical techniques which can be remotely connected to utilisation apparatus by means of optical fibres, although it should be understood that the general principles of the invention are still applicable to sensors which are not so connected by means of optical fibres.

In accordance with one aspect of the present invention, displacement sensing apparatus comprises a light conducting member incorporating a fluorescent substance; an interface, at a predetermined position on the member, at which light can be received from the member; a radiation source which is movable relative to the member to irradiate a portion of the member which is at a corresponding distance from said predetermined interface position along a light conducting path in the member, causing fluorescence of said substance contained in said portion, light generated by said fluorescence being conducted along said path in said member from said portion to reach said predetermined interface position with an attenuation dependent on said corresponding distance; and receiving means responsive to the intensity of the light generated by the fluorescence and received from the member at the interface position to provide an indication of changes in said corresponding distance resulting from displacement of said radiation source relative to the member.

The paper "Dyestuff Intensifies and Projects Light" by R. Bishop, published in Eureka, September 1984, pages 16 to 18, describes some fluorescent materials available in sheet or rod form. A wide variety of other fluorescent materials are also known which have been formed as optical fibres for use as radiation detectors.

The light conducting member employed in the present invention has the characteristics that radiation from the radiation source (typically light at an appropriate wavelength) can enter into the irradiated portion of the light coducting member, producing corresponding fluorescence only in this irradiated portion. The light generated by the fluorescence is itself conducted along an appropriate path in the light conducting member, but with a certain degree of attenuation, so that the intensity of the light in the light conducting member will depend on the distance travelled along the light conducting path from the fluorescent portion. Accordingly, the intensity of the light measured at the interface position can be an indication of the distance of the irradiated portion from the interface along the light conducting path in the member.

It should be appreciated that the invention can be put into practice using any form of light conducing member which has the property of being stimulated to emit light internally when irradiated. Thus the terms "fluorescent" and "fluorescence" when used herein should be construed to include all equivalent forms of stimulation of light emission by radiation, both electromagnetic and ionising particle, such as scintillation produced by gamma radiation.

In preferred embodiments, the light conducting member is elongate, thereby having a single light conducting path along its length. It should be appreciated that the elongate member need not be linear.

Conveniently, the elongate member has opposite ends and said interface is at one end and a further said interface is located at the other end, said receiving means then being responsive to the light intensities from the member at the two ends to provide said indication in a form which is independent of the intensity of the fluorescence in said irradiated portion. This indication may be conveniently provide, as will become apparent later, by taking the ratio of the intensities of the light from the two ends of the member.

In one embodiment, the light coducting member is arranged so as when irradiated to fluoresce at two different light wavelengths at which the attenuation coefficient in the member is substantially the same, said receiving means including filters to receive light of respective ones of the different wavelengths from the two ends of the member. In this example, the elongate member may comprise two lengths of light conducting material in side by side parallel configuration, the two lengths being prepared so as when irradiated to fluoresce respectively at said two different wavelengths. For these arrangements, the receiving means preferably includes detecting means for detecting the relative intensity of the light of the two different wavelengths received from respective ends of the member and optical fibre means conducting the light from the ends of the member to the detecting means, the optical fibre means combining the light from the two ends at the respective different wavelengths to be conducted along a single optical fibre to the detecting means.

In a different embodiment, the light conducting member may be arranged so as when irradiated to fluoresce at two different light wavelengths at which the respective attenuation coefficients in the member are substantially different, said receiving means being responsive to the respective intensities of light at the two wavelengths received from the member at the interface to provide said indication in a form which is independent of the intensity of the fluorescence in said irradiated portion.

In a further embodiment, the elongate member may comprise two lengths of light conducting material in side by side parallel configuration, the two lengths being prepared to have substantially different attenuation coefficients to light generated by fluorescence in the respective lengths, said receiving means being responsive to the respective intensities of light received from the two lengths at the interface to provide said indication in a form which is independent of the intensity of the radiation source. In this example, the two lengths of light conducting material may be prepared so as, when irradiated, to fluoresce at respective different light frequencies at which the lengths have said different attenuation coefficients.

The above described embodiments including an elongate light conducting member are appropriate for measuring displacement along the length of the member. In a different embodiment, the light conducting member is two dimensional and there is asecond interface at a second predetermined position on the member and said receiving means is responsive to the intensity of light received at the two interface positions to provide indications of changes in said corresponding distance from each of said predetermined interface positions. In this way the distance of the irradiated portion of the member from each of the two interface positions can be determined, enabling the position of the irradiating source relative to the light conducting member to be measured in two dimensions.

There may be opposed pairs of said interfaces defining a respective light conducting axis in the two dimensional member between the interfaces of each pair, said receiving means being responsive to the light intensities received from the member at the interfaces of each pair to provide a respective indication of the relative distance of the irradiated portion of the member from the two interfaces of the pair.

In an alternative arrangement, the light conducting member is arranged so as when irradiated to fluoresce at two different light wavelengths at which the respective attenuation coefficients in the member are substantially different, said receiving means being responsive to the respective intensities of light at the two wavelengths received from the member at each of the interfaces to provide said indications in forms which are independent of the intensity of the fluorescence in said irradiated portion.

In a particular refinement applicable to embodiments in which the displacement indication is normalised with respect to the intensity of fluorescence or of the radiation source, the radiation source may include adjustment means to vary the intensity of radiation applied to said portion of the member and control means responsive to the receiving means to control the adjustment means so as to maintain within predetermined limits the intensity of light generated by the fluorescence and received from the member at the or each interface. In this way the light signal available in the receiving means can be maintained within the useful dynamic range of the receiving means. For example when the irradiated portion of the light conducting member is at the greatest distance from the interface at which the fluorescent light is detected, there is maximum attenuation. This can be compensated for by increasing the radiation intensity, thereby increasing the intensity of fluorescence in the irradiated portion.

The radiation source may be adapted to amplitude modulate the radiation applied to said portion of the member at a predetermined modulating frequency, producing corresponding amplitude modulation of the fluorescence from said portion, and the receiving means may then be arranged to demodulate the light received from the member at the or each interface to provide said indication as a function of the modulation amplitude. This technique can be used to enable the fluorescence produced by the movable source of radiation to be distinguished from fluorescence produced in the light conducting member by extraneous radiation sources.

With such an arrangement there may then be included a second radiation source to irradiate a corresponding further portion of the light conducting member, the second radiation source being adapted to amplitude modulate the radiation applied to the further portion at a second predetermined modulating frequency which is different from said first mentioned modulating frequency, producing corresponding amplitude modulation of the fluorescence from said further portion, and the receiving means being arranged to demodulate the fluorescent light received at the or each interface from both of the irradiated portions to provide respective indications which are each a function of the modulation amplitude at the respective modulation frequency. By this technique, the signals from different radiation sources can be discriminated in the receiving means.

In an alternative arrangement, the apparatus may include a second radiation source to irradiate a corresponding further portion of the light conducting member, and time division multiplexing means to operate the first mentioned and second radiation sources at different times, the receiving means being also responsive to the multiplexing means to provide a respective said indication for each of the sources.

In either of the foregoing examples with two radiation sources, the second radiation source may be fixed relative to the light conducting member so as to irradiate a fixed reference portion at a constant position on the member, the receiving means being then arranged to provide said indication of changes in the distance from the interface of the portion irradiated by the movable radiation source, in a form which is independent of losses in the receiving means. By providing a reference source which can be distinguished in the receiving means from the movable source, losses in the receiving means which would otherwise cause aberrations in the measurements can be removed from the resulting indications.

As mentioned previously, the various embodiments of the present invention can most coveniently be used together with fibre optic means adapted to conduct fluorescent light received from the member at the or each interface to a remote location for provision of said indication, and similarly with further fibre optic means adapted to conduct irradiating light from a remote location to irradiate the corresponding portion of the light conducting member. In this way the only interconnections between the displacement sensor and the utilisation circuitry is by means of fibre optic connections and the sensor itself contains no electronic components.

In the previously described examples of the present invention, a localised portion or spot only of the light conducting member is irradiated and the position or displacement of this spot is sensed. However, the principles of the present invention are also applicable to the case in which a variable area or length of the light conducting member is irradiated.

In another aspect of the present invention, there is provided apparatus for measuring a parameter, comprising an elongate light conducting member incorporating a fluorescent substance, an interface at which light conducted along the member can be received from the member, a radiation source capable of irradiating up to a predetermined maximum length of the member to cause fluorescence of said substance contained in said length, light generated by said fluorescence being conducted along said member to the interface, occluding means located between the source and the member to cause a partial length only of the member to be irradiated by the source, said partial length corresponding to the parameter to be measured, and receiving means responsive to the intensity of light generated by the fluorescence and received from the member at the interface to provide an indication of the length of the member being irradiated and hence of the parameter to be measured, wherein the light conducting member is arranged so as, when irradiated, to fluoresce at two different light wavelengths at which there are substantially different attenuation coefficients for light conducted along the member, said receiving means being responsive to the respective intensities of light at the two wavelengths received from the member at the interface to provide said indication in a form which is independent of the intensity of the radiation source.

It may be appreciated that the attenuation in the light conducting member can result in the increase in detected fluorescent intensity at the interface, resulting from an extra unit length of irradiated member at a substantial distance from the interface, being substantially less than the increase in intensity resulting from irradiation of an extra unit length close to the interface.

In one preferred embodiment, the cross section of the light conducting member over which it can be irradiated by the source to produce fluorescence increases with increasing distance along the member from the interface, the rate of increase in width being selected to provide a predetermined, e.g. linear, relationship between the irradiated partial length of the member and the intensity of light received from the member at the interface.

In one example embodying this aspect of the present invention, the occluding means comprises a container with walls which are transparent to the radiation from the source, whereby the radiation is occluded by opaque material in the container so that said partial length corresponds inversely to the level of the material in the container.

The principles of the invention are applicable to measuring parameters other than displacement and in a different aspect, the invention provides apparatus for measuring the attenuation of light transmitted between two points, comprising a first length of light conducting member incorporating a fluorescent substance at least at one location along said first length, a second length of light conducting material incorporating a fluorescent substance at least at one location along said second length, means establishing a two directional light path between the said locations in said first and second lengths, respective sources of radiation to irradiate said locations in said first and second lengths causing fluorescence of said substance, light generated by said fluorescence being conducted from each said location, both along said light path towards and beyond the other said location, and in the reverse direction along the respective length of light conducting member away from the other said location, a respective receiving means for each said length of light conducting member and responsive to the intensities of light coducted along the respective said lengths both directly from said location in the respective said length and from said location in the other said length, means modulating the light generated by said fluorescence at each of said locations so that the intensities from the two locations can be separately detected at each said receiving means, and attenuation measuring means responsive to the detected intensities of light from each of said locations as received at each of said receiving means to provide an indication of variations in the attenuation of the light along said light pathbetween said two locations. With this arrangement, the attenuation between the two locations can be calculated, as described later herein, independently of the intensities of the radiation sources and the resulting fluorescent regions, and of losses between the fluorescent location and the respective receiving means and in the receiving means themselves.

Conveniently, said means establishing a light path comprises a futher length of the light conducting member contiguous with said first and second lengths. In practice, said first, second and further lengths of light conducting member may be constituted by a continuous length of optical fibre or light conducting rod. Changes in attenuation in the fibre or rod may be caused by various effects including stress, micro-bending, temperature, radiation or by loss of light in partially frustrated total internal reflection in a composition sensor or refractometer. Thus, the attenuation measuring apparatus may be used to sense any of the above parameters for example.

Examples of the present invention will now be described with reference to the accompanying drawings.

DETAILED DESCRIPTION OF THE PREFERRED EMBODIMENTS

Figure 1:
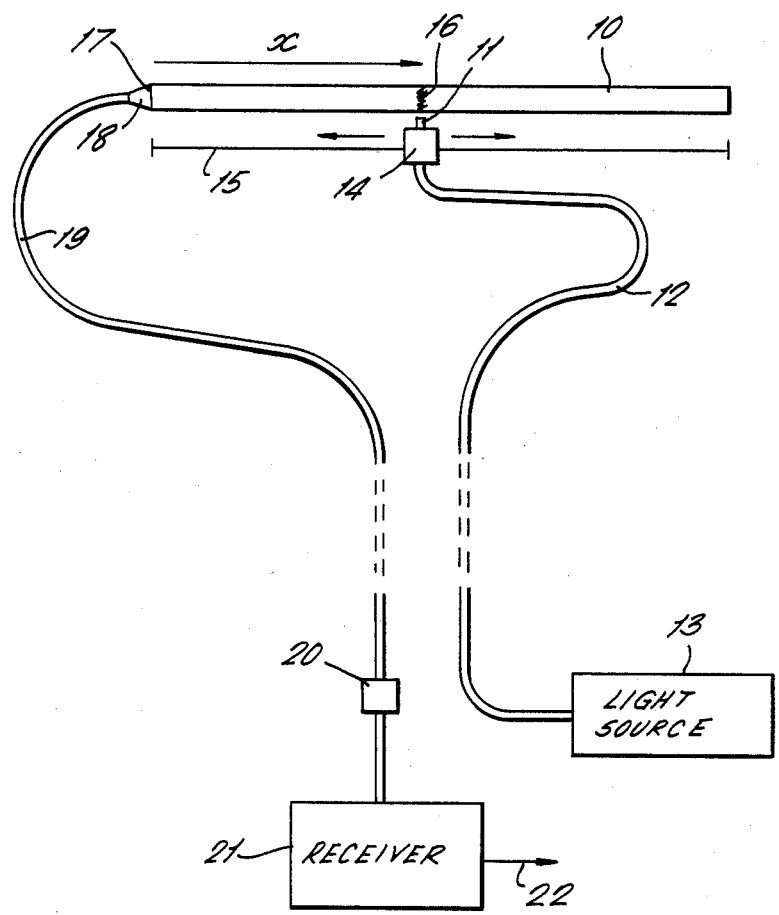
FIG. 1 is a schematic diagram illustrating a basic form of displacement sensor embodying the present invention.

FIG. 1 is an illustration of a basic embodiment of the invention and comprises an elongate light conducting member 10 which may be in the form of a light conducting rod or an optical fibre. The member 10 is made to contain a fluorescent substance so that when a portion of the member 10 is appropriately irradiated from outside, the substance in the irradiated portion is caused to fluoresce. A substantial proportion of the light generated by the fluorescence is trapped within the light conducting member 10, by total internal reflection, and is therefore conducted in each direction along the member 10 away from the fluorescing portion.

It is a common feature of transparent fluorescent materials that they have substantial attenuation to light at the wavelengths of the fluorescence. Accordingly the light generated by the fluorescence conducted along in the member 10 is attenuated as it travels along the length of the member.

These properties of the fluorescent light conducting member 10 are harnessed in this embodiment of the invention to provide a transducer for measuring the displacement of one member relative to another. The light conducting member 10 is located fixed relative to one of the movable members and a source of irradiation is located to move with the other of the movable members. The relative movement is arranged to be in the direction of the length of the member 10.

In the described example the source of radiation is the end 11 of an optical fibre 12 along which light at an appropriate wavelength is conducted from a remote light source 13. The end 11 of the fibre 12 is held in a carriage 14 which is movable along a track 15 parallel to the light conducting member 10. The end 11 of the fibre 12 is directed towards the outer surface of the light conducting member 10 so that light from the source 13 emerging from the end of the fibre 12 enters the light conducting member 10 to irradiate a small portion 16 of the member. As a result, the portion 16 is caused to fluoresce.

The position of the fluorescing portion 16 of the light conducting member 10 relative to an end 17 of the member 10 is, of course, dependent on the relative position between the carriage 14 and the light conducting member.

The end 17 of the light conducting member 10 is provided with an interface 18 which enables light reaching the end 17 having been conducted along the member 10 to be collected by the interface 18 and directed into one end of an optical fibre 19. The light entering the optical fibre 19 is conducted by the fibre to a remotely located detector 20 connected to a receiver 21. The detector 20 and receiver 21 are arranged to provide on an output line 22 a signal which is a function of the intensity of the light received at the interface 18 having been conducted along the member 10 from the fluorescent portion 16.

If the intensity of the light received at the interface 18 is I, this may be represented as $$I = a I_0 e^{-\alpha x} \tag{1}$$

where a is a constant, $I_0$ is the intensity of the fluorescence of the portion 16, $\alpha$ is the attenuation coefficient in the member 10 for the light from the fluorescence and x is the distance of the fluorescent portion 16 from the end 17.

It can be seen that if $I_0$ is constant, the distance x can be represented as a function of the measured intensity I at the end 17 of the rod. Accordingly, the receiver 21 is arranged to produce a signal on line 22 which is representative of the distance x.

Figure 2:
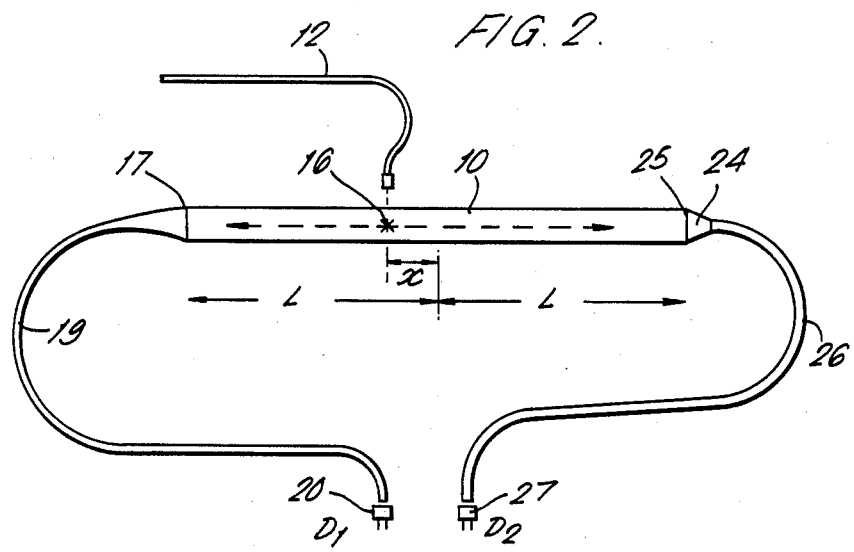
FIG. 2 is a schematic diagram of an improved embodiment of the invention.

In practice, it may be difficult to maintain $I_0$ constant, for different positions of the carriage 14 along the length of the member 10. Furthermore, the intensity $I_0$ is dependent on the output power of the light source 13. FIG. 2 illustrates an embodiment of the invention in which the output indication can be made independent of the intensity of the fluorescent portion.

In FIG. 2, the basic structure is the same as in FIG. 1 except that a second interface 24 is provided at the opposite end 25 of the elongate light conducting member 10. Accordingly light from the fluorescent portion 16 conducted along the member 10 in the opposite direction towards the end 25 is collected by the interface 24 and conducted by a second optical fibre 26 to a second detector 27. Detector 27 is also connected to the receiver 21 shown in FIG. 1.

If the light conducting member 10 has a total length of 2 L and the distance x is this time measured from the centre of the member 10, then the intensities $I_1$ and $I_2$ measured at the two ends of the member 10 can be represented as follows:

$$I_1 = a I_0 e^{-\alpha(L-x)} \tag{2}$$

$$I_2 = b I_0 e^{-\alpha(L+x)} \tag{3}$$

where a and b are different constants dependent on losses associated with the respective fibres 19 and 26.

From (2) and (3):

$$(I_1/I_2) = (a/b) \cdot e^{2\alpha x} \tag{4}$$

Figure 3:
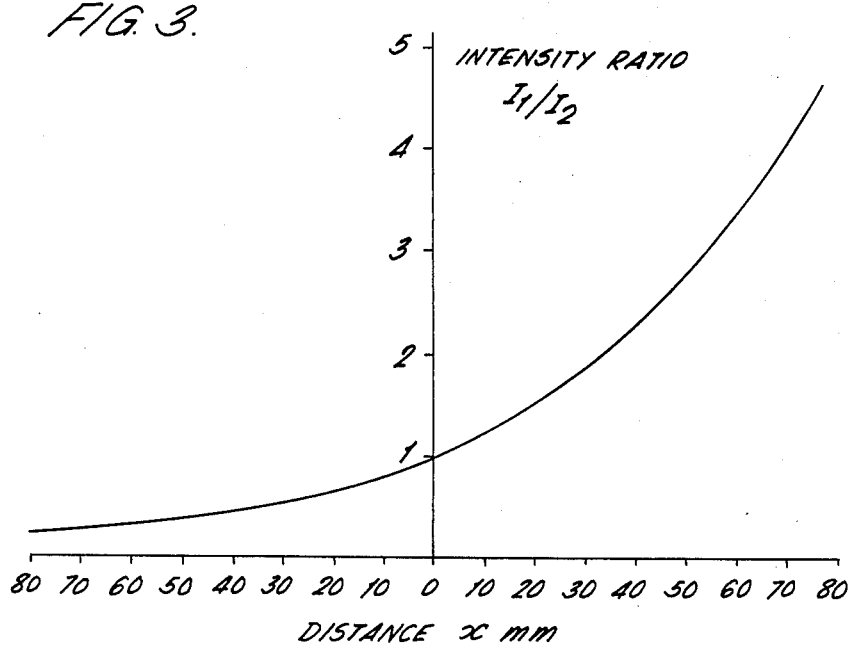
FIG. 3 is a graphical representation of the relationship between displacement and the output indication available from the embodiment of FIG. 2.

This has a function as illustrated in FIG. 3 in which it is assumed that $\alpha = 10 m^{-1}$. It can be appreciated that this value is independent of $I_0$.

Figure 4:
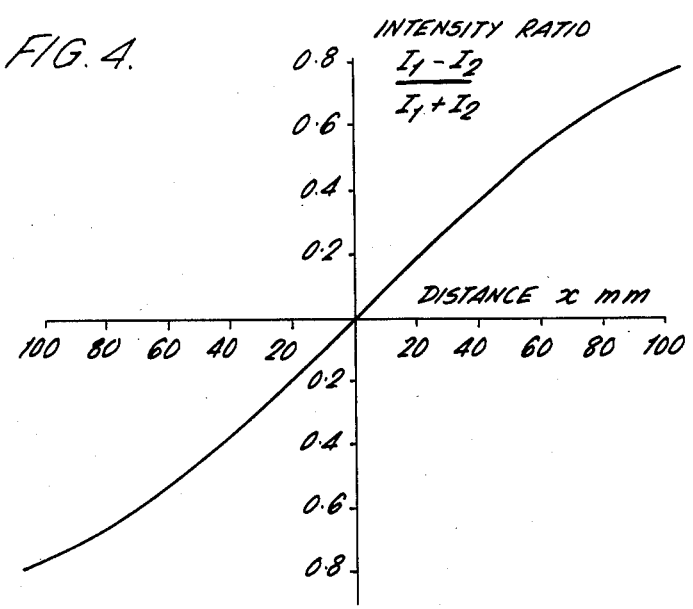
FIG. 4 is a graphical representation of the relationship between displacement and an alternative output indication available from the embodiment of FIG. 2.

It is also possible to produce the function $$(I_1 - I_2)(I_1 + I_2) \tag{5}$$

which is also independent of $I_0$ and has a function as represented in FIG. 4.

Figure 5:
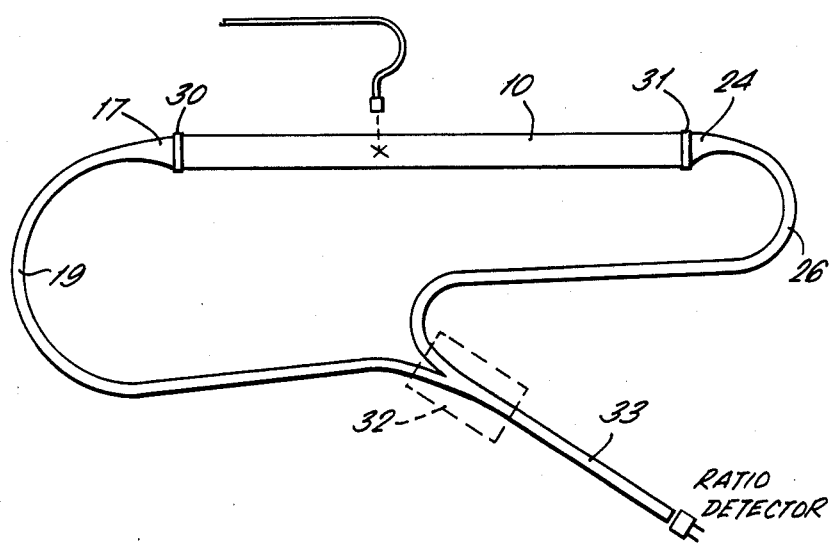
FIG. 5 is a schematic representation of an alternative embodiment of the invention.

It can be seen that the above arrangement still provides a function which is dependent on the values a and b which are representative of losses in the two fibres 19 and 26. FIG. 5 illustrates a variation in which the dependence on these losses can be reduced. In FIG. 5, the fluorescent substance in the light conducting member 10 is one which fluoresces over a band of wavelengths including two wavelengths which are sufficiently different to be separately filtered. Then the interfaces 17 and 24 at the opposite end of the member 10 include filters 30 and 31 respectively so that only light from the fluorescence at a first wavelength is passed by the filter 30 to enter the fibre 19 and only light at a second wavelength is passed by the filter 31 to enter the fibre 26. Provided the attenuation coefficient in the member 10 is the same at both the wavelengths, the light in the two fibres 19 and 26 can be coupled together in a coupler 32 to be conducted to the remote detector along a single optical fibre 33. The remote detector 34 is then arranged to be capable of distinguishing the intensities at the two wave lengths so as to provide the function $I_1/I_2$ as mentioned above. With this arrangement losses in the main length of fibre 33 interconnecting the transducer and the remote receiver are common for the signals from both ends of the light conducting member 10 and therefore cancel.

Figure 6:
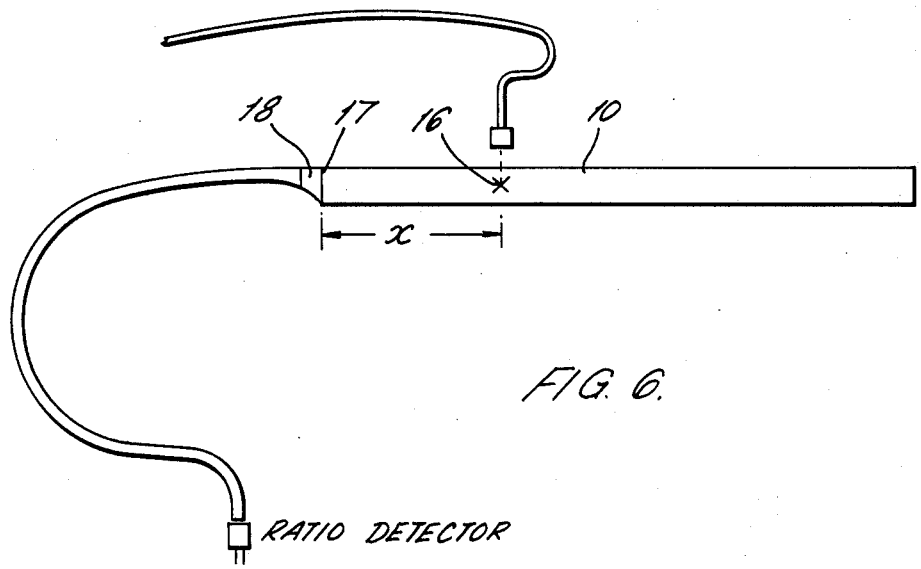
FIG. 6 is a schematic representation of a further embodiment of the invention enabling a normalised output indication to be obtained from a single end of the light conducting member.

FIG. 6 illustrates a further embodiment enabling the fluorescent intensity to be cancelled out but employing an interface at only one end of the light conducting member 10. In this example, the light conducting member 10 is formed of a substance which fluoresces at two wavelengths at which wavelengths the attenuation coefficients are substantially different. It can be seen therefore that the ratio of the intensities reaching the end 17 of the member 10 at the two wavelengths is dependent on the distance x of the fluorescent portion 16 from the end 17. If the attenuation coefficients at the two wavelengths are $\alpha_1$ and $\alpha_2$, the received intensities are represented by $I_1$ and $I_2$ as follows:

$$I_1 = a_1 I_0 e^{-\alpha_1 x} \tag{6}$$

$$I_2 = a_2 I_0 e^{-\alpha_2 x} \tag{7}$$

The value $I_0$ here represents the total irradiating intensity and $a_1$ and $a_2$ are constants which include factors relating to the proportion of the radiating intensity producing fluorescence at each particular wavelength.

From (5) and (6), $$(I_1/I_2) = a_1/a_2 \cdot e^{(\alpha_2 - \alpha_1)x} \tag{8}$$

Figure 7:
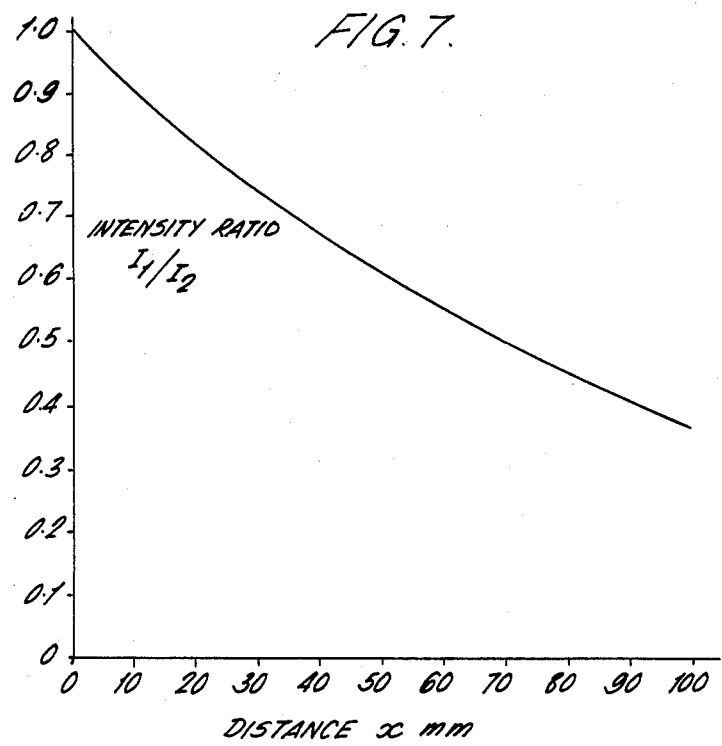
FIG. 7 is a graphical representation of the relationship between displacement and an output indication available from the embodiment of FIG. 6.

This function is represented graphically in FIG. 7.

Hitherto, the described embodiments of the invention have included an elongate light conducting member in the form of a rod. These embodiments are capable of providing an indication of displacement in one dimension. It may be appreciated that the light conducting member 10 used in the aforementioned embodiments need not in fact be linear so that these embodiments can be used to determine displacements along curved paths.

Figure 8:
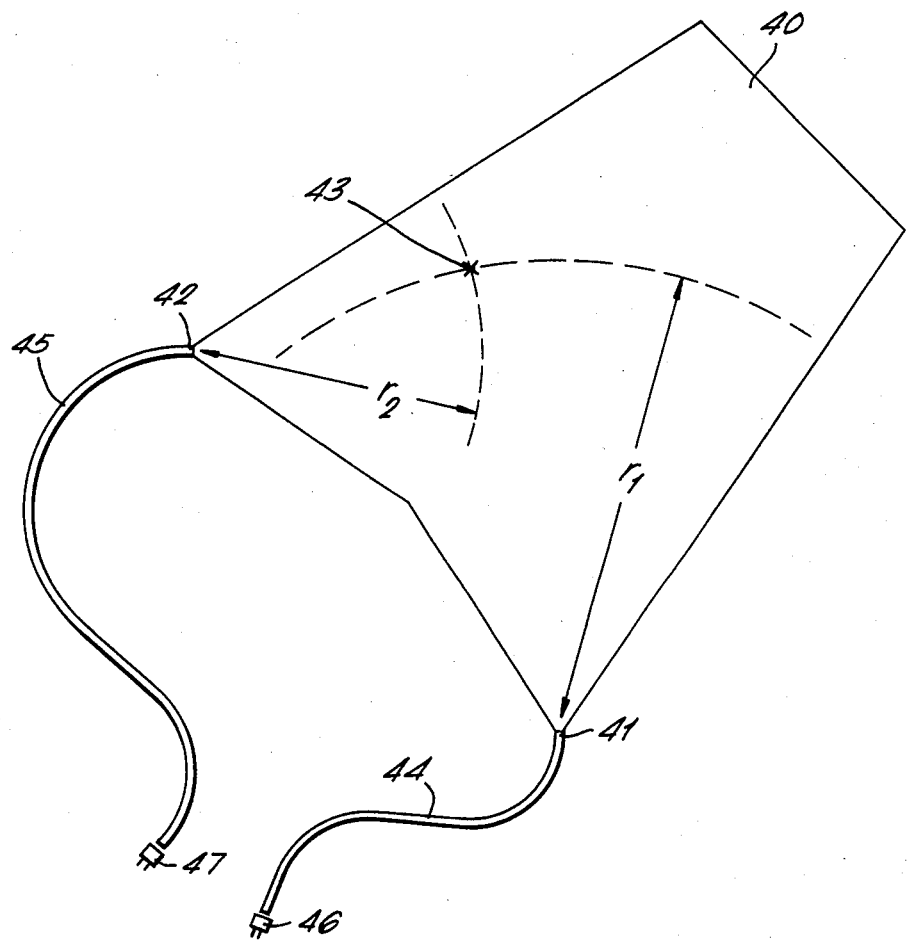
FIG. 8 is a diagrammatic representation of an embodiment of the invention employing a two dimensional light conducting member.

FIG. 8 illustrates a different embodiment of the invention in which the principles of the invention are employed to determine displacement in two dimensions. In this embodiment, the light conducting member is formed as a plate or sheet 40. Two interfaces 41 and 42 are provided for receiving light conducted in the thickness of the sheet 40 from an irradiated spot 43. If the spot 43 is irradiated so as to produce fluorescence at this spot in the thickness of the sheet 40, light from the fluorescence is conducted between the surfaces of the sheet in all directions away from the spot. The intensity of light from this fluorescence reaching each of the interfaces 41 and 42 is dependent on the distance of the fluorescence spot from the respective interfaces.

In a practical embodiment, the sheet 40 is arranged to fluoresce simultaneously at different wavelengths which have different attenuation coefficients so that light received at the two wavelengths at each of the interfaces 41 and 42 can be fed along respective optical fibres 44 and 45 to ratio detectors 46 and 47 connected as usual to a receiver (not shown). In this way, the distance of the light spot from each interface can be determined using the techniques described above in relation to the embodiment shown in FIG. 6.

The sheet is shaped, such as shown in FIG. 8, to eliminate any ambiguities of position. It should also be appreciated that the sheet 40 need not be planar but may be spherically curved for example. In such cases, the position of the light spot in the surface of the sheet can be determined.

Figure 9:
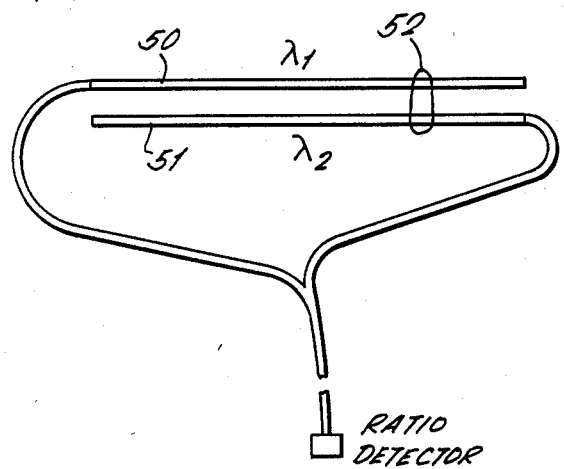
FIGS. 9 and 10 illustrate diagrammatically variations of the embodiments of FIGS. 5 and 6 employing a pair of parallel light guides.

The embodiment described above with respect to FIG. 5 requires that the light conducting member fluoresces at two different wavelengths at which it has substantially the same attenuation coefficient. FIG. 9 illustrates an alternative form of this embodiment in which the light conducting member is provided by two parallel light conducting rods 50 and 51 which are irradiated sumultaneously from the movable radiation source at a corresponding position 52. One of the rods 50 is arranged to fluoresce at a first wavelength and the second rod 51 is arranged to fluoresce at the second wavelength and the two rods are selected so that at these two wavelengths they have substantially the same attenuation coefficient. There is then no need for filters at the ends of the rods since light at the first wavelength can be collected from the end of one rod whereas light at the second wavelength can be collected from the opposite end of the other rod.

Figure 10:
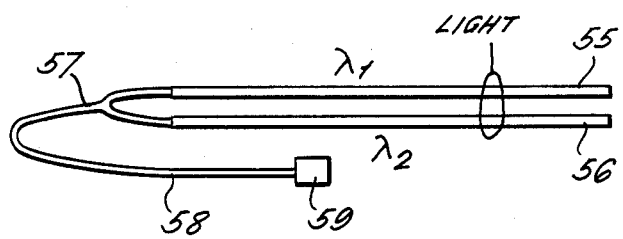

Further, the embodiment described above in relation to FIG. 6 has a light conducting member which fluoresces at two wavelengths at which the rod has substantially different attenuation coefficients. FIG. 10 illustrates an alternative form of this embodiment in which again the single light conducting member is replaced by a pair of parallel rods 55 and 56. One of the rods 55 is adapted to fluoresce at the first wavelength and to have a first attenuation coefficient at the wavelength and the other rod is adapted to fluoresce at a different wavelength and to have a different attenuation coefficient at that wavelength. The light collected from the adjacent ends of the rods 55 and 56 is combined in a coupler 57 to be conducted along a common optical fibre 58 to the detector 59

Hitherto, all the illustrated embodiments have been described as including a constant irradiation source for illuminating the fluorescent portion of the light conducting member. It may be desirable to provide amplitude modulation of the irradiation source, thereby producing corresponding amplitude modulation of the fluorescence. The detectors and receivers associated with the embodiments can then be arranged to demodulate the received light intensities to provide indications which are functions of the depth of modulation, rather than the absolute intensity value of the received light. In this way, the demodulated light signals can be relatively insensitive to extraneous light sources which may cause random fluorescence along the length of the light conducting rod.

Figure 11:
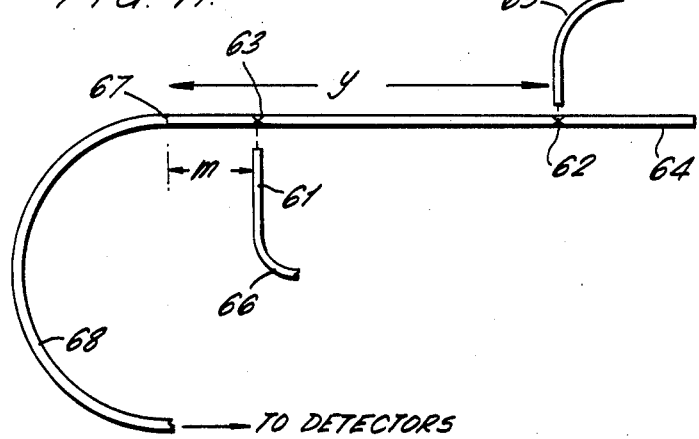
FIG. 11 illustrates diagrammatically an embodiment of the invention employing a fixed reference irradiating source.

With reference to FIG. 11, a further preferred arrangement is illustrated in which there are two separate sources of radiation 60 and 61 irradiating corresponding different portions 62 and 63 of the fluorescent light conducting member 64. The irradiating light provided to the sources 60 and 61 along respective optical fibres 65 and 66 may be amplitude modulated at respective different modulation frequencies. Then, light from the fluorescent portions 62 and 63 is connected along the member 64 to an end 67 at which it is collected at an interface and directed along an output optical fibre 68 to a detector and receiver. At the receiver (which is not shown in FIG. 11) the light intensity signals which are amplitude modulated at different frequencies can be distinguished by appropriate frequency discrimination circuits so that the depth of modulation at each frequency can be determined and accordingly an indication provided of the intensity received from each of the irradiated portions 62 and 63. Conveniently then the light conducting member 64 can be arranged to fluoresce at two different wavelengths which have substantially different attenuation coefficients so that the detected intensity at each modulation frequency of the two wavelengths can be used to provide an intensity value, and accordingly a value for the distance of the respective irradiated portion from the end 67, which is independent of the intensity of the radiating source. Accordingly, the embodiment of FIG. 11 can be employed to provide a value for the distance y of the source 60 from the end 67 and also a value for the distance m which is the distance of the source 61 from the end 67.

If the distance m is kept constant and only the distance y is variable, then any variation in the measured value for m, resulting for example from variations in the attenuation coefficient with temperature, can be used to compensate the measured value of y.

Figure 12:
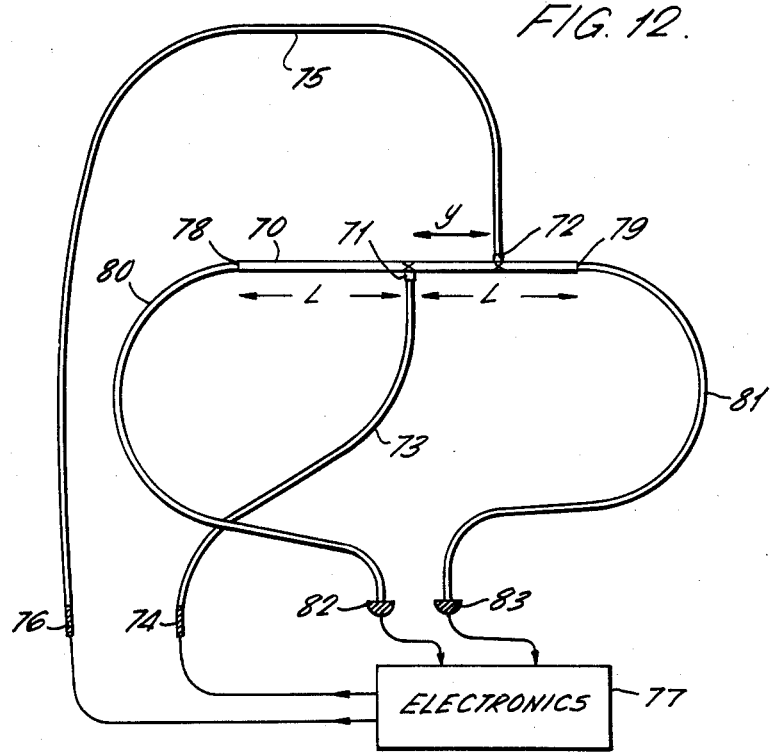
FIGS. 12 and 13 illustrate preferred embodiments of the invention enabling compensation for spurious wavelength dependent effects.

FIG. 12 illustrates a still further embodiment of the invention which makes use of the fixed reference fibre described with reference to FIG. 11 in the double ended mode illustrated in FIG. 2 above. The fluorescent light conducting member is shown at 70 and two irradiation sources 71 and 72 irradiate different portions of the member 70. The irradiation source 71 is a reference source supplied with light along a supply fibre 73 from a light emitting diode (LED) 74. The source 71 irradiates a fixed portion, say, midway between the ends of the light conducting member 70. The other source 72 is supplied with light along a supply fibre 75 from a second LED 76. The source 72 is movable.

An electronics unit 77 provides drive voltages for the LED's 74 and 76 so as to amplitude modulate the light emitted by the diodes 74 and 76 at two distinct modulating frequencies.

Light from each of the fluorescent portions irradiated by the sources 71 and 72 is conducted along the member 70 to both ends 78 and 79 of the member at which the light is collected and directed along output fibres 80 and 81 to respective detectors 82 and 83. Electrical signals corresponding to the detected intensities of the light collected at the ends of the member 70 are fed from the detectors 82 and 83 to the electronics unit 77. The electronics unit operates to demodulate the detected light signals from the detectors 82 and 83 to provide values corresponding to the received intensity from each of the irradiated portions of the member 70 at each end of the member. Thus, the intensity of light received at the detector 82 from fluorescence caused by irradiation from the source 71 can be represented as follows:

$$I_{A2} = a\, I_2\, e^{-\alpha L} \qquad (9)$$

Where a is a factor representing the losses in output fibre 80, $I_2$ is the intensity of the fluorescence resulting from the irradiation from source 71 and $\alpha$ is the attenuation coefficient in the member 70. Similarly, at detector 83 the received intensity is:

$$I_{B2} = b\, I_2\, e^{-\alpha L} \tag{10}$$

Where b is a factor representing the losses in the output fibre 81.

The intensities received at the detectors 82 and 83 from fluorescence caused by irradiation from source 72 can similarly be represented as follows:

$$I_{A1} = a\, I_1\, e^{-\alpha(L+y)} \tag{11}$$

$$I_{B1} = b\, I_1\, e^{-\alpha(L-y)} \tag{12}$$

Where $I_1$ is the intensity of fluorescence resulting from irradiation from the source 72.

Each of the values $I_{A2}$, $I_{B2}$, $I_{B1}$, $I_{B1}$, can be individually determined in the electronics units 77, since the irradiating sources are amplitude modulated at different frequencies.

Taking the quantity:

$$Q = \frac{I_{B1}/I_{B2} - I_{A1}/I_{A2}}{I_{A1}/I_{A2} + I_{B1}/I_{B2}} \tag{13}$$

leads to $$Q = \frac{e^{2\alpha y} - 1}{e^{2\alpha y} + 1} \tag{14}$$

This is a function identical to that shown graphically in FIG. 4 but is now independent both of the intensities of the irradiation sources and also of losses in the two output fibres.

Figure 13:
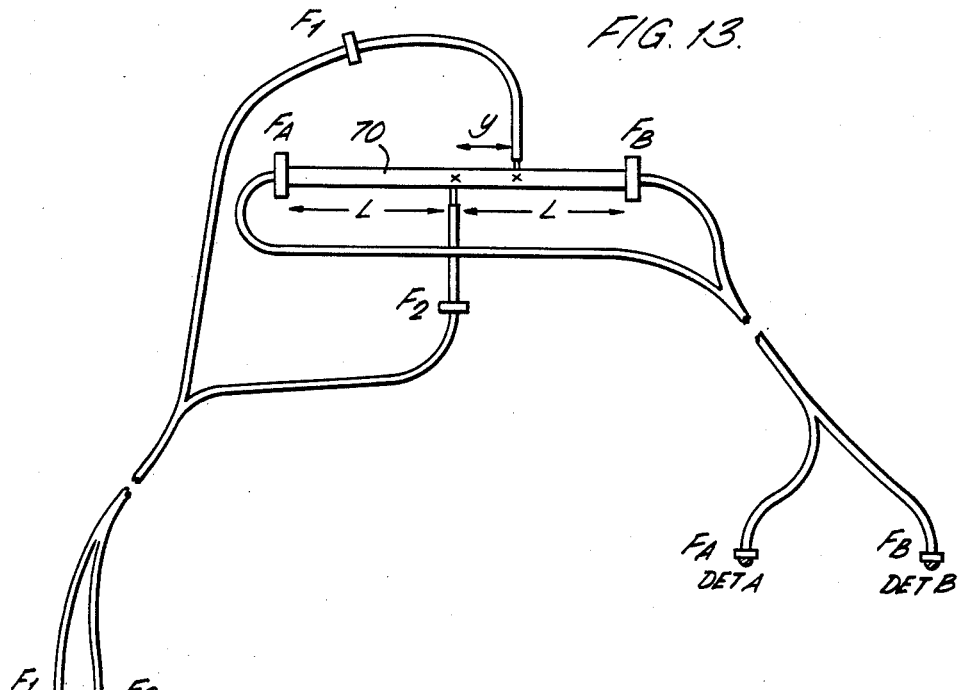

It can be seen that the above described example requires a total of four optical fibres interconnecting the sensing transducer and the electronics unit. The number of interconnecting fibres ca be reduced to two, if filters are provided to enable colour multiplexing of signals in the interconnecting fibres. This arrangement is illustrated in FIG. 13. It is then necessary for the light conducting member 70 to fluoresce at the two wavelengths passed by the filters at opposite ends of the member 70 but to have substantially the same attenuation coefficient at these two wavelengths. Similarly, the amplitude modulated radiation sources are at different light wavelengths, which must still be within the range of wavelengths which cause fluorescence in the member 70.

The various embodiments of displacement sensor described above can find application in a number of different fields including, positional feedback applications in robotics, valve positioners, and also in fly-by-light applications in aircraft. The two dimensional version described above may be appropriate to flight control joy stick position sensing. An additional possible application is where the movable radiation source is in the form of a "mouse" moved over a two dimensional light conducting sheet to provide a positional computer input. The sheet could be provided in the form of an overlay screen in front of the usual cathode ray dispaly and using a fibre optic pencil to point to the screen. Appropriate detectors at the edge of the screen, which would be formed as a sheet of fluorescent light conducting material, would read out the position of the fibre optic pen on the screen.

Figure 14:
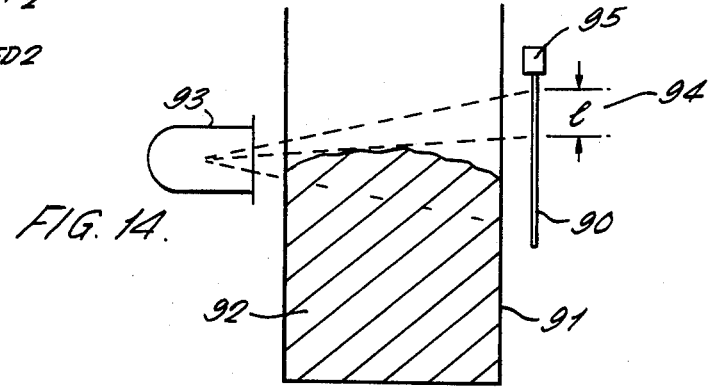
FIGS. 14 and 15 illustrate an embodiment of the invention in the form of a level measuring device.
Figure 15:
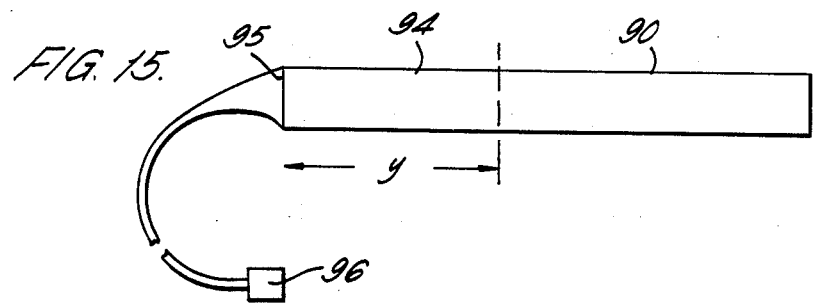

FIGS. 14 and 15 illustrate an alternative aspect of the present invention employed as a level sensor. Whereas in the embodiments described hitherto, the position of a discreet fluorescent spot or localised portion of an elongate light conducting rod is determined, the following example responds to a variable length of a light conducting rod being irradiated to produce fluorescence throughout this irradiated length.

An appropriate arrangement is illustrated in FIG. 14 in which a vertically extending light conducting rod 90 is provided extending along one side of a container 91 partly filled with a material 92. A source of radiation 93 is provided on the opposite side of the container 91. The radiation source 93 with the container 91 is arranged so that when the container is empty of the material 92, the entire length of the light conducting rod 90 can be illuminated, thereby causing fluorescence throughout the rod 90. The presence of material 92 in the container 91 progressively occludes an increasing proportion of the radiation from the source 93 so that only a part length 94 of the rod 90 is still illuminated.

If the illuminated length is y, it can be shown that the intensity $I_1$ of fluorescent light reaching an upper end 95 of the rod 90 can be expressed in the form:

$$I_1 = a_1 I_0 (1 - e^{-\alpha_1 y}) \tag{15}$$

Where $a_1$ is a constant, $I_0$ is representative of the illumination intensity from the source 93 and $\alpha_1$ is the attenuation coefficient in the rod.

If as in the previous embodiments, the intensity at two wavelengths of fluorescence having different attenuation coefficients is measured, the ratio of these intensities at a detector 96 can be a function of the illuminated length y and independent of the intensity $I_0$.

Figure 16:
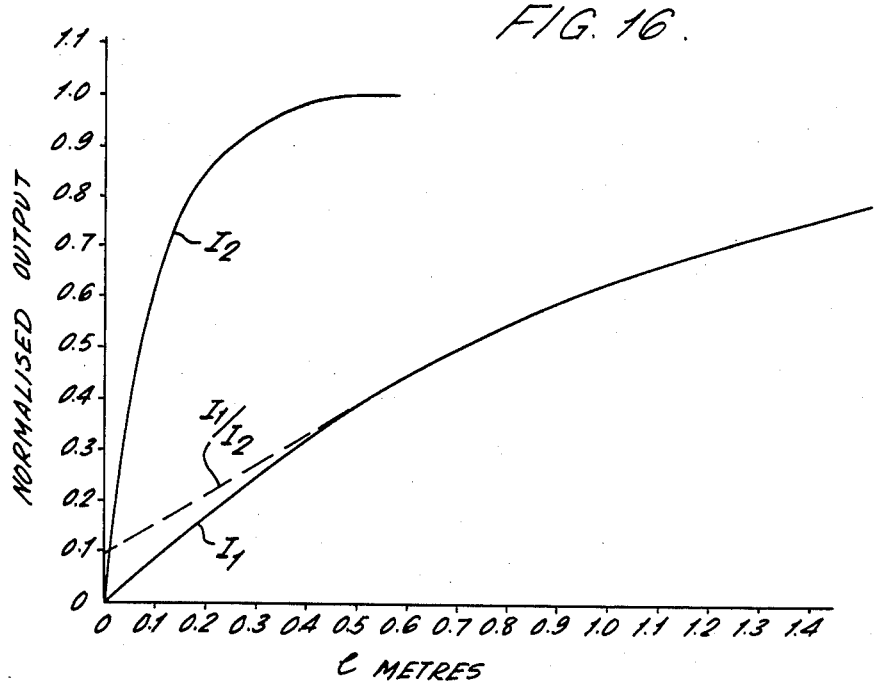
FIG. 16 is a graphical representation of the output indications obtainable from the embodiment of FIGS. 14 and 15.
Figure 17:
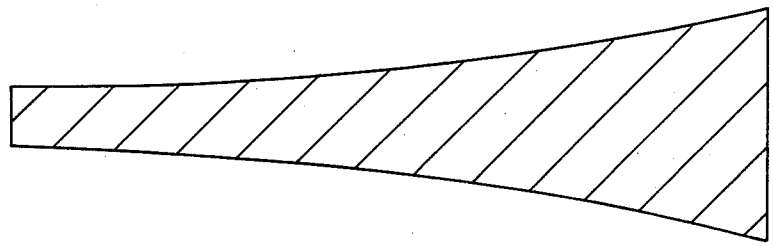
FIG. 17 illustrates the shape of elongate light conducting member which may be employed in the embodiments of FIG. 14 and 15 to linearise the response.

The values for the received intensity $I_1$ and $I_2$ at the two wavelengths and also the corresponding value of the ratio of these intensities is shown graphically in FIG. 16. In FIG. 16 the intensity values are all normalised and are equivalent to the case where the ratio of attenuation coefficients at the two wavelengths is 1:10. It may be desirable to linearise the relationship between the function $I_1/I_2$ and the length y. This may be done by varying the width of the fluorescent light conducting rod 90 along its length so that it becomes wider with increasing distance y from the end 95. Such a profile is illustrated in FIG. 17. The profile is selected to achieve the desired linearity and an exponential shape may be satisfactory. It can be seen that an increased volume of rod is caused to fluoresce with a unit increase in irradiated length the further along the rod from the receiving end 95. In an alternative arrangement, the illumination intensity from the source 93 may be non constant along the length of the rod 90 to provide increased intensity per unit length of rod at greater distances from the receiving end 95. The greater intensity of illuminating light will produce a corresponding increased intensity of fluorescence in the rod.

Figure 18:
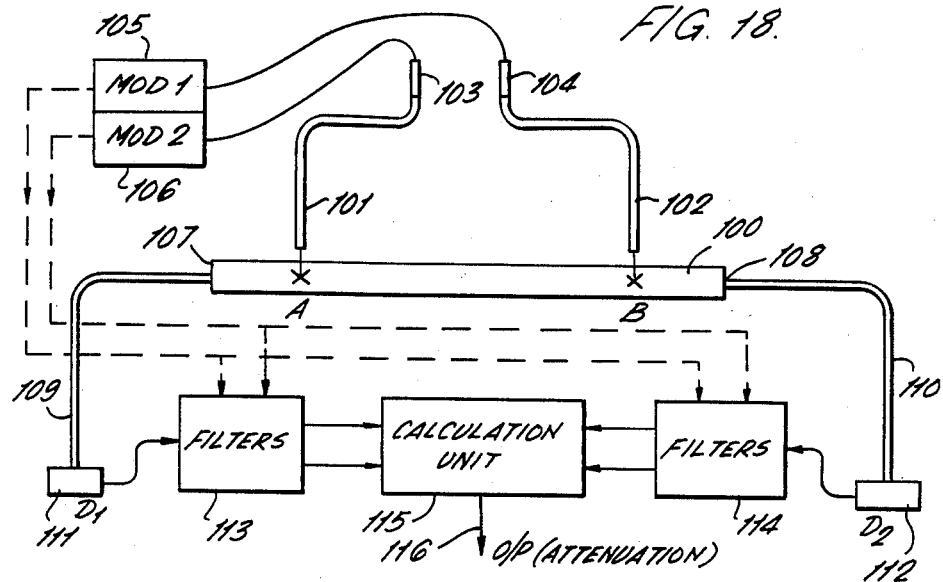
FIG. 18 illustrates a further embodiment of the invention adapted for measuring attenuation.
Figure 19:
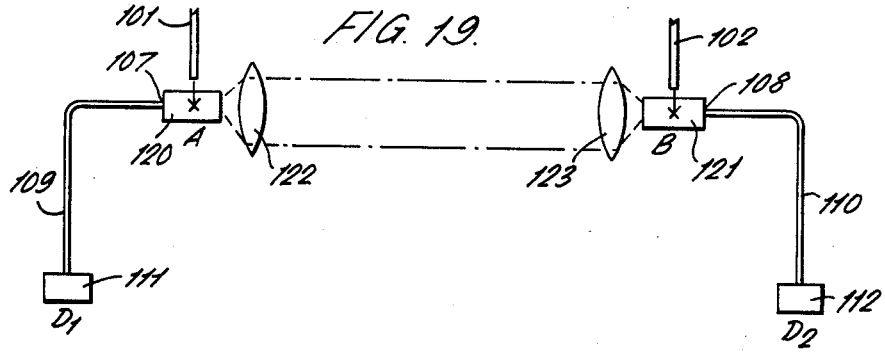
FIGS. 19 and 20 illustrate further developments of the embodiments of FIG. 118.
Figure 20:
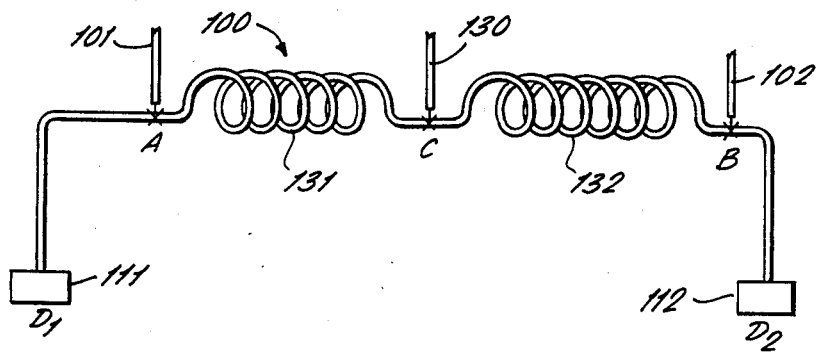

FIGS. 18 to 20 illustrate still further embodiments of the invention which are particularly adapted for measuring the attenuation of light conducted between two points. Whereas in the previously described embodiments illustrated in FIGS. 1 to 13, there must be at least one source of radiation which is movable relative to the light conducting member containing fluorescent material, in the following described embodiments, there are two sources of light, producing fluorescence within lengths of light conducting member, both sources, being at fixed positions relative to the respective lenght of light conducting member. Instead of the signals produced being used to calculate the distance between the two sources of fluorescent light, they are used to measure the level of attenuation along the light conducting path between the two points.

Referring particularly to FIG. 18, a length of light conducting rod or optical fibre 100 contains a fluorescent material. The rod or fibre 100 is illuminated at two points A and B along its length by means of light emitted from the ends of input optical fibres 101 and 102. The light to the input fibres 101 and 102 is supplied from light emitting diodes 103 and 104 energise from first and second modulators 105 and 106. The modulators 105 and 106 amplitude modulate the light emitted by the diodes 103 and 104 at two difference frequencies.

As a result of the light from the fibres 101 and 102 entering into the fluorescent rod 100, fluorescence of the material in the rod is caused at the points A and B and light from these fluorescent points travels in both directions along the rod. The intensity of the fluorescent light from these points A and B is amplitude modulated at the frequencies determined by the modulators 105 and 106.

Light is collected at each end 107 and 108 of the rod 100 and conducted along further lengths of flexible optical fibre 109 and 110 to respective photo detectors 111 and 112. The electrical signals generated at these detectors are fed to respective filters 113 and 114 where the resultant light signal is demodulated to produce respective signals from each filter corresponding to the intensity of light received at the respective detector from each of the two source points A and B.

In a preferred arrangement, the filters 113 and 114 may be product filters which are then supplied with synchronisation signals from the modulators 105 and 106 at the respective frequencies of modulation.

Signals representing the intensity of light at each detector from each of the two fluorescent points A and B are supplied from the two filters 113 and 114 to a calculation unit 115 which calculates therefrom a value for the attenuation of light between points A and B and produces a corresponding output signal on output line 116.

The signal at detector 111 due to the fluorescent light from point A is a $I_A$;

the signal at detector 111 due to the light from point B is a $G_{AB} I_B$;

the signal at detector 112 due to light from point A is b $G_{BA} I_A$;

the signal at detector 112 due to light from point B is b $I_B$;

where a and b are the semi-constant attenuations in the two end sections of the rod 100 and in the fibres 109 and 110 respectively and $G_{AB}$ and $G_{BA}$ are the attenuations (which might not be the same) in the two directions along the rod 100 between points A and B.

Because the two light sources irradiating the rod or fibre at points A and B are amplitude modulated at different frequencies, the intensities from the two points A and B at each of the detectors 111 and 112 can be separately determined. It can be seen therefore that the ratio of the two intensities at the detector 111 is $$\frac{I_A}{G_{AB} I_B}$$

Similarly the ratio of the two signals at detector 112 is $$\frac{G_{BA} I_A}{I_B}$$

The ratio of these two values is then $G_{AB} \cdot G_{BA}$.

Accordingly if the attenuation in the rod or fibre 100 is symmetrical in the two directions, the above value is equal to the square of this attenuation.

It can be seen therefore that the above described arrangement is capable of monitoring the attenuation in the fibre between the points A and B in a way which is independent of the intensities of the irradiating light sources and of any losses in the end portions of the fibre or rod 100, in the output fibres 109 and 110 and in the interfaces with the detectors 111 and 112. Variations in attenuation in the rod or fibre 100 may be produced by a number of external effects so that the device can then be used for measuring these corresponding parameters. For example variations of attenuation may be caused by stress in the fibre or rod, micro-bending, temperature changes, radiation damage or by loss of light in partially frustrated total internal reflection where the rod forms part of a composition sensor or refractometer.

Further a suitable magneto-strictive coating could be used to make the stress a function of magnetic field.

The rod or fibre 100 may in fact not be continuous between the points A and B and an appropriate arrangement is illustrated in FIG. 19. In this Figure, parts corresponding to those illustrated in FIG. 18 are identified by the same reference numerals. Furthermore, the various electronic components shown in FIG. 18 may also be employed with the embodiment of FIG. 19.

In FIG. 19, the rod or fibre 100 of FIG. 18 is replaced by a first length of rod or fibre 120 adjacent the end 107 and a second length 121 adjacent the end 108. The input fibres 101 and 102 produce fluorescence in the respective 120 and 121 at points A and B. Light from the fluorescence at points A and B emerges from the right hand side of the length of rod 120 and from the left hand side of the length of rod 121, respectively. The light path between the two points A and B is completed by means of lenses 122 and 123 arranged to focus light emerging from each of the lengths 120 and 121 so as to reenter the other such length.

It can be seen therefore that this arrangement operates in the same way as that illustrated in FIG. 18 providing a measure of the attenuation between points A and B over the complete light path between these points, including the space between the lenses 122 and 123. Accordingly the apparatus may be used to measure attenuation through any partially or occasionally light transmitting object located in the light path between the lenses 122 and 123. For example the gap may contain a shutter modulator or a liquid of varying opacity.

This embodiment of the invention is also not restricted to the use of just two input fibres with associated fluorescent points. FIG. 20 illustrates an arrangement with three input fibres producing three fluorescent points A, B and C along a continuous length of optical fibre. In the embodiment illustrated in FIG. 20, elements corresponding to those shown in FIGS. 18 and 19 are given the same reference numerals. There is thus an additional central input fibre 130 which is arranged to irradiate an intermediate point C between points A and B along the length of the fibre 100. The fibre 100 is thus separated into a first section 131 between points A and C and a second section 132 between points C and B.

The input fibre 130 is fed with light which is amplitude modulated at a third frequency, distinct from the modulation frequencies of the light to input fibres 101 and 102, so that the intensity of light from the fluorescence at point C can also be independently determined at each of detectors 111 and 112.

It can be seen therefore that by this arrangement the attenuation in the section 131 of the fibre can be measured quite independently of any variation of the attenuation in section 132, and similarly the attenuation of section 132 can be measured independently of variations in the attenuation of section 131. In a practical arrangement, the section 131 may be employed as a reference and section 132 as the measuring element of an appropriate sensor.

More than three input fibres may be used to divide the sensing fibre into three or more sections. Attenuation in each of these sections can be independently sensed provided the various light sources are distinctly modulated.

I claim:

1. Displacement sensing apparatus, comprising a light conducting member incorporating a fluorescent substance; an interface, at a predetermined position on the member, at which light can be received from the member; a radiation source which is movable relative to the member to irradiate a portion of the member which is at a corresponding distance from said predetermined interface position along a light conducting path in the member, causing fluorescence of said substance contained in said portion, light generated by said fluorescence being conducted along said path in said member from said portion to reach said predetermined interface position with an attenuation dependent on said corresponding distance; and receiving means responsive to the intensity of the light generated by the fluorescence and received from the member at the interface position to provide an indication of changes in said corresponding distance resulting from displacement of said radiation source relative to the member.

2. Apparatus as claimed in claim 1 wherein the light conducting member is elongate having a single light conducting path along its length.

3. Apparatus as claimed in claim 2 wherein the elongate member has opposite ends and said interface is at one end and a further said interface is located at the other end, said receiving means being responsive to the light intensities from the member at the two ends to provide said indication in a form which is independent of the intensity of the fluorescence in said irradiated portion.

4. Apparatus as claimed in claim 3 wherein the light conducting member is arranged so as when irradiated to fluoresce at two different light wavelengths at which the attenuation coefficient in the member is substantially the same, said receiving means including filters to receive light of respective ones of the different wavelengths from the two ends of the member.

5. Apparatus as claimed in claim 4 wherein the elongate member comprises two lengths of light conducting material in side-by-side parallel configuration, the two lengths being prepared so as when irradiated to fluoresce respectively at said two different wavelengths.

6. Apparatus as claimed in claim 4 wherein the receiving means includes detecting means for detecting the relative intensity of the light of the two different wavelengths received from respective ends of the member and optical fibre means conducting the light from the ends of the member to the detecting means, the optical fibre means combining the light from the two ends at the respective different wavelengths to be conducted along a single optical fibre to the detecting means.

7. Apparatus as claimed in claim 1 wherein the light conducting member is arranged so as when irradiated to fluoresce at two different light wavelengths at which the respective attenuation coefficients in the member are substantially different, said receiving means being responsive to the respective intensities of light at the two wavelengths received from the member at the interface to provide said indication in a form which is independent of the intensity of the fluorescence in said irradiated portion.

8. Apparatus as claimed in claim 2 wherein the elongate member comprises two lengths of light conducting material in side-by-side parallel configuration, the two lengths being prepared to have substantially different attenuation coefficients to light generated by fluorescence in the respective lengths, said receiving means being responsive to the respective intensities of light received from the two lengths at the interface to provide said indication in a form which is independent of the intensity of the radiation source.

9. Apparatus as claimed in claim 8 wherein the two lengths of light conducting material are prepared so as, when irradiated, to fluoresce at respective different light frequencies at which the lengths have said different attenuation coefficients.

10. Apparatus as claimed in claim 1 wherein the light conducting member is two dimensional and there is a second interface at a second predetermined position on the member and said receiving means is responsive to the intensity of light received at the two interface positions to provide indications of changes in said corresponding distance from each of said predetermined interface positions.

11. Apparatus as claimed in claim 10 wherein there are opposed pairs of said interfaces defining a respective light conducting axis in the two dimensional member between the interfaces of each pair, said receiving means being responsive to the light intensities received from the member at the interfaces of each pair to provide a respective indication of the relative distance of the irradiated portion of the member from the two interfaces of the pair.

12. Apparatus as claimed in claim 10 wherein the light conducting member is arranged so as when irradiated to fluoresce at two different light wavelengths at which the respective attenuation coefficients in the member are substantially different, said receiving means being responsive to the respective intensities of light at the two wavelengths received from the member at each of the interfaces to provide said indications in forms which are independent of the intensity of the fluorescence in said irradiated portion.

13. Apparatus as claimed in claim 3 wherein the radiation source includes adjustment means to vary the intensity of radiation applied to said portion of the member and control means responsive to the receiving means to control the adjustment means so as to maintain within predetermined limits the intensity of light generated by the fluorescence and received from the member at the or each interface.

14. Apparatus as claimed in claim 1 wherein the radiation source is adapted to amplitude modulate the radiation applied to said portion of the member at a predetermined modulating frequency, producing corresponding amplitude modulation of the fluorescence from said portion and the receiving means is arranged to demodulate the light received from the member at the or each interface to provide said indication as a function of the modulation amplitude.

15. Apparatus as claimed in claim 14 and including a second radiation source to irradiate a corresponding further portion of the light conducting member, the second radiation source being adapted to amplitude modulate the radiation applied to the further portion at a second predetermined modulating frequency which is different from said first mentioned modulating frequency, producing corresponding amplitude modulation of the fluorescence from said further portion and the receiving means being arranged to demodulate the fluorescent light received at the or each interface from both of the irradiated portions to provide respective indications which are each a function of the modulation amplitude at the respective modulation frequency.

16. Apparatus as claimed in claim 1 and including a second radiation source to irradiate a corresponding further portion of the light conducting member, and time division multiplexing means to operate the first mentioned and second radiation sources at different times, the receiving means being also responsive to the multiplexing means to provide a respective said indication for each of the sources.

17. Apparatus as claimed in claim 15 wherein the second radiation source is fixed relative to the light conducting member so as to irradiate a fixed reference portion at a constant position on the member, the receiving means being arranged to provide said indication of changes in the distance from the interface of the portion irradiated by the movable radiation source, in a form which is independent of losses in the receiving means.

18. Apparatus as claimed in claim 1 wherein the receiving means includes fibre optic means adapted to conduct fluorescent light received from the member at the or each interface to a remote location for provision of said indication.

19. Apparatus as claimed in claim 18 wherein the or each radiation source includes fibre optic means adapted to conduct irradiating light from a remote location to irradiate the corresponding portion of the light conducting member.

20. Apparatus for measuring a parameter, comprising an elongate light conducting member incorporating a fluorescent substance, an interface at which light conducted along the member can be received from the member, a radiation source capable of irradiating up to a predetermined maximum length of the member to cause fluorescence of said substance contained in said length, light generated by said fluorescence being conducted along said member to the interface, occluding means located between the source and the member to cause a partial length only of the member to be irradiated by the source, said partial length corresponding to the parameter to be measured, and receiving means responsive to the intensity of light generated by the fluorescence and received from the member at the interface to provide an indication of the length of the member being irradiated and hence of the parameter to be measured, wherein the light conducting member is arranged so as, when irradiated, to fluoresce at two different light wavelengths at which there are substantially different attenuation coefficients for light conducted along the member, said receiving means being responsive to the respective intensities of light at the two wavelengths received from the member at the interface to provide said indication in a form which is independent of the intensity of the radiation source.

21. Apparatus as claimed in claim 20 wherein the cross section of the light conducting member over which it can be irradiated by the source to produce fluorescence increases with increasing distance along the member from the interface, the rate of increase in width being selected to provide a predetermined relationship between the irradiated partial length of the member and the intensity of light received from the member at the interface.

22. Apparatus as claimed in claim 20 wherein the occluding means comprises a container with walls which are transparent to the radiation from said source, whereby the radiation is occluded by opaque material in the container so that said partial length corresponds inversely to the level of the material in the container.

23. Apparatus for measuring the attenuation of light transmitted between two points, comprising a first length of light conducting member incorporating a fluorescent substance at least at one location along said first length, a second length of light conducting material incorporating a fluorescent substance at least at one location along said second length, means establishing a two directional light path between the said locations in said first and second lengths, respective sources of radiation to irradiate said locations in said first and second lengths causing fluorescence of said substance, light generated by said fluorescence being conducted from each said location, both along said light path towards and beyond the other said location, and in the reverse direction along the respective length of light conducting member away from the other said location, a respective receiving means for each said length of light conducting member and responsive to the intensities of light conducted along the respective said lengths both directly from said location in the respective said length and from said location in the other said length, means modulating the light generated by said fluorescence at each of said locations so that the intensities from the two locations can be separately detected at each said receiving means, and attenuation measuring means responsive to the detected intensities of light from each of said locations as received at each of said receiving means to provide an indication of variations in the attenuation of the light along said light path between said two locations.

24. Apparatus as claimed in claim 23 wherein said means establishing a light path comprises a further length of the light conducting member contiguous with said first and second lengths.

25. Apparatus as claimed in claim 23 wherein said means establishing a light path comprises focussing means for transmitting light from an end of one said length of light conducting member to an end of the other said length.

26. Apparatus as claimed in claim 23, including a third length of light conducting material incorporating a fluorescent substance at least at one location along said third length, said means establishing a two directional light path providing said path via said third length, and a further source of radiation to irradiate said location in said third length, the light generated by fluorescence at the location in said third length being also modulated so that its intensity can be separately detected at the two receiving means, and said attenuation measuring means being selectively responsive to the detected intensities of light from either pair of said locations which are adjacent along light path to provide an indication of variations in the attenuation of the light along the part of said light path between the respective pair.

27. Apparatus as claimed in claim 23 wherein said modulating means is adapted to amplitude modulate the radiation applied to the location in each length of the light conducting member, of a respective predetermined frequency.

28. Apparatus as claimed in claim 23 wherein said modulating means is adapted to modulate the radiation applied to the different locations to effect time division multiplexing.

* * * * *

UNITED STATES PATENT AND TRADEMARK OFFICE
CERTIFICATE OF CORRECTION

PATENT NO. : 4,727,247

DATED : February 23, 1988

INVENTOR(S) : James S. Johnston

It is certified that error appears in the above-identified patent and that said Letters Patent is hereby corrected as shown below:

Column 22, line 2, delete "of" and insert --at--.

Signed and Sealed this

Nineteenth Day of July, 1988

Attest:

DONALD J. QUIGG

Attesting Officer

Commissioner of Patents and Trademarks